A. R. HULTIN.
SAW HANDLE.
APPLICATION FILED SEPT. 1, 1909.
982,003.
Patented Jan. 17, 1911.
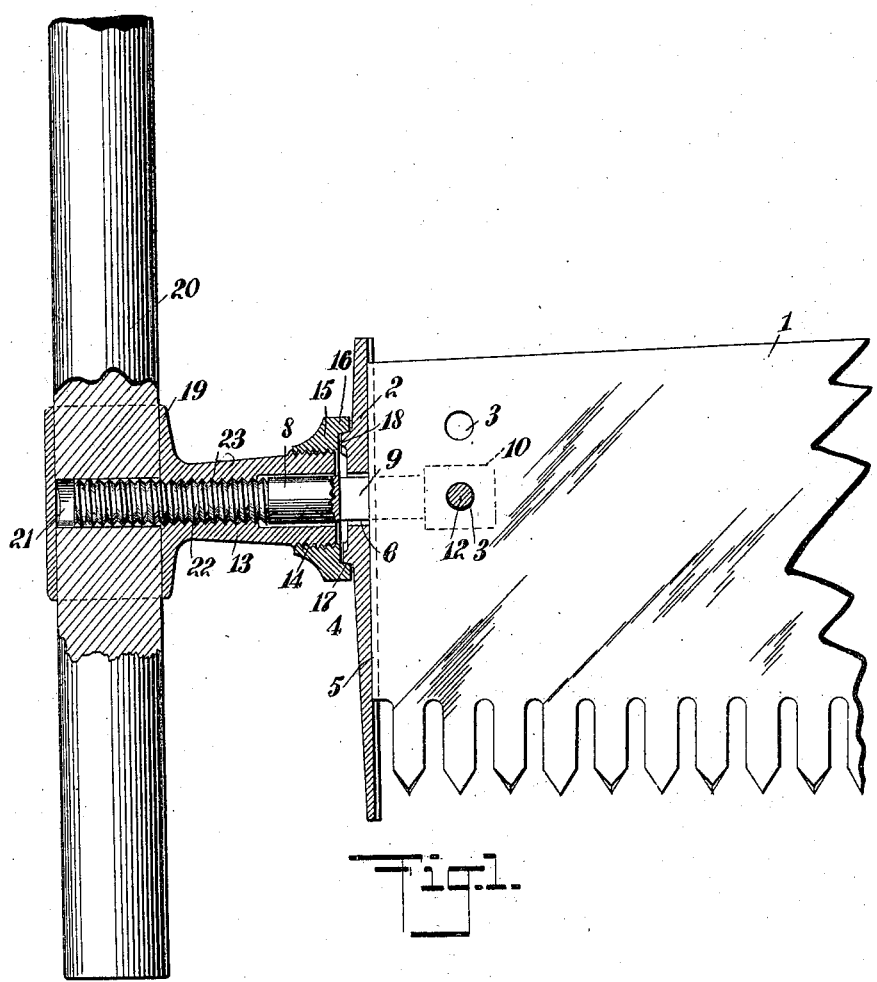
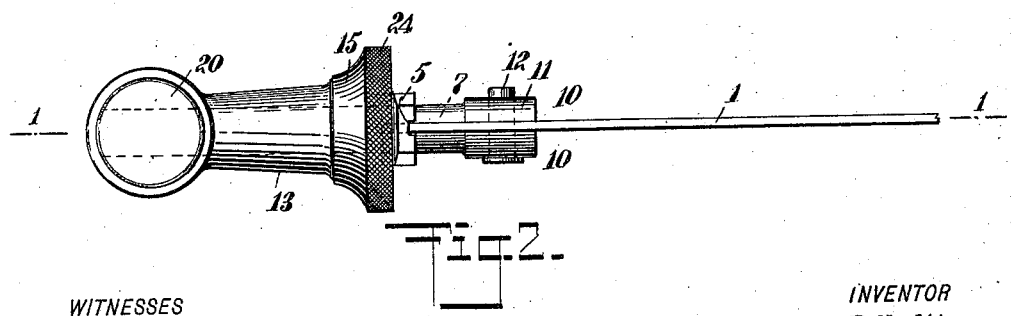
WITNESSES
INVENTOR
Adolph R. Hultin
BY
ATTORNEYS

UNITED STATES PATENT OFFICE.

ADOLPH RICHARD HULTIN, OF PROSPER, OREGON.

SAW-HANDLE.

982,003.

Specification of Letters Patent.

Patented Jan. 17, 1911.

Application filed September 1, 1909. Serial No. 515,576.

*To all whom it may concern:*

Be it known that I, ADOLPH R. HULTIN, a citizen of the United States, and a resident of Prosper, in the county of Coos and State of Oregon, have invented a new and Improved Saw-Handle, of which the following is a full, clear, and exact description.

This invention relates to saw handles, and particularly to saw handles of large saws which are detachably secured to the ends of the blade.

The object of the invention is to produce a saw handle which can be very readily attached to the blade and which can be adjusted to different angular positions with respect to the blade.

A further object is to construct the device and the blade of the saw so as to permit of the adjustment of the position of the blade with respect to the handle without changing the angular relation of the parts.

The invention consists in the construction and combination of parts to be more fully described hereinafter and particularly set forth in the claims.

Reference is to be had to the accompanying drawings forming a part of this specification, in which similar characters of reference indicate corresponding parts in both the figures.

Figure 1 is a side elevation of the end of a blade to which my saw handle is attached, the parts of the handle being shown partly in cross section on the line 1—1 in Fig. 2 and partly in elevation; and Fig. 2 is a plan of an end of a saw blade and handle.

Referring more particularly to the parts, 1 represents the blade of the saw which is provided near its end 2 with a pair of openings 3 arranged vertically one above the other when the saw blade is held horizontally in a vertical plane.

My handle comprises a shoe 4 which is in the form of an elongated bar having a channel or groove 5 in its side face in which groove seats the end of the saw blade, as indicated. This shoe is provided with an opening 6 through which passes the neck 7 of a clamping stud 8. This neck 7 is formed with a longitudinal slot 9 which receives the end of the saw blade, as shown, and by reason of this slot the neck 7 is formed into two forks 10 which are disposed on opposite sides of the blade, as indicated most clearly in Fig. 2. At their extremities these forks are enlarged so as to form heads 11, and these heads are provided with alining openings through which a pin 12 passes, as shown. This pin is adapted to pass through either one of the openings 3 so as to secure the stud to the blade. The stud 8 is received in a tubular casing 13, the inner end of which is provided with screw threads 14 for the attachment of a locking washer 15. This locking washer has an annular shoulder 16 on its inner side, presenting a tapered or conical face 17. This conical face 17 forms a seat for the outer side of the shoe 4, for which purpose the shoe is provided with shoulders 18 which fit against the side, as indicated in Fig. 1. The outer portion of the case 13 is formed into an enlarged tubular head or sleeve 19, through which the handle passes, as shown, so that the handle projects at both ends of the sleeve. The handle 20 is formed with a transverse bore 21 which receives the end of a threaded shank 22 which is formed on the stud, and these threads engage similar threads 23 which are formed in the bore of the case 13, as indicated. The outer side of the washer 15 is provided with a nurling 24, as indicated in Fig. 2.

In applying the handle to the saw blade, the end of the saw is introduced into the slot 5 and the pin 12 is passed through the ends of the forks 10 and through one of the openings 3. The shoe is then fitted onto the end of the blade. The handle 20 can then be rotated on the axis of the stud 8 in such a way as to draw the stud toward the handle and move the case toward the saw. The handle will be rotated in this manner until the shoe and handle become very firmly attached to the blade. If desired, the handle 20 can be allowed to rest with its axis lying in the plane of the blade, as indicated in Fig. 1. If it should happen that the handle will not be tight in this position the washer 15 can be adjusted toward the blade so that the handle will become tight when in the plane of the blade. If it is desired to secure the handle in any other adjusted position it can be rotated so as to bring it into this desired relation to the blade and if it is not tight in that position it can be made tight by adjusting the washer 15. Normally the washer 15 will rotate with the case but if it is desired that the handle should become tight in any position it will be tight at or near this position if the washer is properly adjusted.

Attention is called to the fact that the threaded shank of the stud secures the handle 20 in the sleeve 19. If it is desired to secure the blade in a different lateral position on the shoe the handle can be attached at the other opening 3 which is nearer to the back edge of the saw.

Having thus described my invention, I claim as new and desire to secure by Letters Patent,—

1. A saw handle, comprising an apertured shoe grooved on its inner face and provided with shoulders on its outer face, a tubular casing having an enlarged tubular head, said casing being internally screw threaded and provided with an external screw thread at its inner end, a stud working in the casing and having a bifurcated and apertured outer end projecting through the shoe, and a threaded inner end projecting into the tubular head of the casing, a nut on the inner end of the casing and having an annular shoulder fitting the shoulders of the shoe, and a handle in the tubular head of the casing and provided with a transverse bore in said head into which the threaded portion of the stud projects.

2. A saw handle, comprising an apertured shoe grooved on its inner face and provided with tapered shoulders on its outer face, a tubular casing internally screw threaded and provided with an exterior screw thread at its inner end and with a head at its outer end, a stud working in the casing and projecting through the shoe, said stud having a threaded inner end and a bifurcated and apertured outer end, a nut on the inner end of the casing and provided with an annular shoulder having a conical face fitting the shoulders of the shoe, and a handle secured in the head of the casing.

3. A saw handle, comprising an apertured shoe grooved on its inner face, a tubular casing internally screw threaded and provided with an exterior screw thread at its inner end and with a tubular head at its outer end, a stud working in the casing and having a bifurcated and apertured outer end projecting through the shoe and a threaded inner end projecting into the tubular head of the casing, a nut on the inner end of the casing and engaging the shoe, and a handle in the head of the casing and having a transverse bore within the head and into which projects the threaded end of the stud.

4. In a saw handle, an apertured shoe, a tubular casing internally screw threaded and having a tubular head at its outer end, a threaded stud working in the casing and having its inner end projecting into the tubular head of the casing and its outer end projecting through the shoe and provided at said end with means, whereby it may be secured to a saw blade, and a handle in the head of the casing and provided with a transverse opening into which the threaded portion of the stud projects.

In testimony whereof I have signed my name to this specification in the presence of two subscribing witnesses.

ADOLPH RICHARD HULTIN.

Witnesses:
    PETER F. GEHLKE,
    JOHN NIELSON.